Oct. 23, 1934.  A. H. WISEMAN  1,977,786
BRAKE BOOSTER
Filed July 18, 1933   2 Sheets-Sheet 1
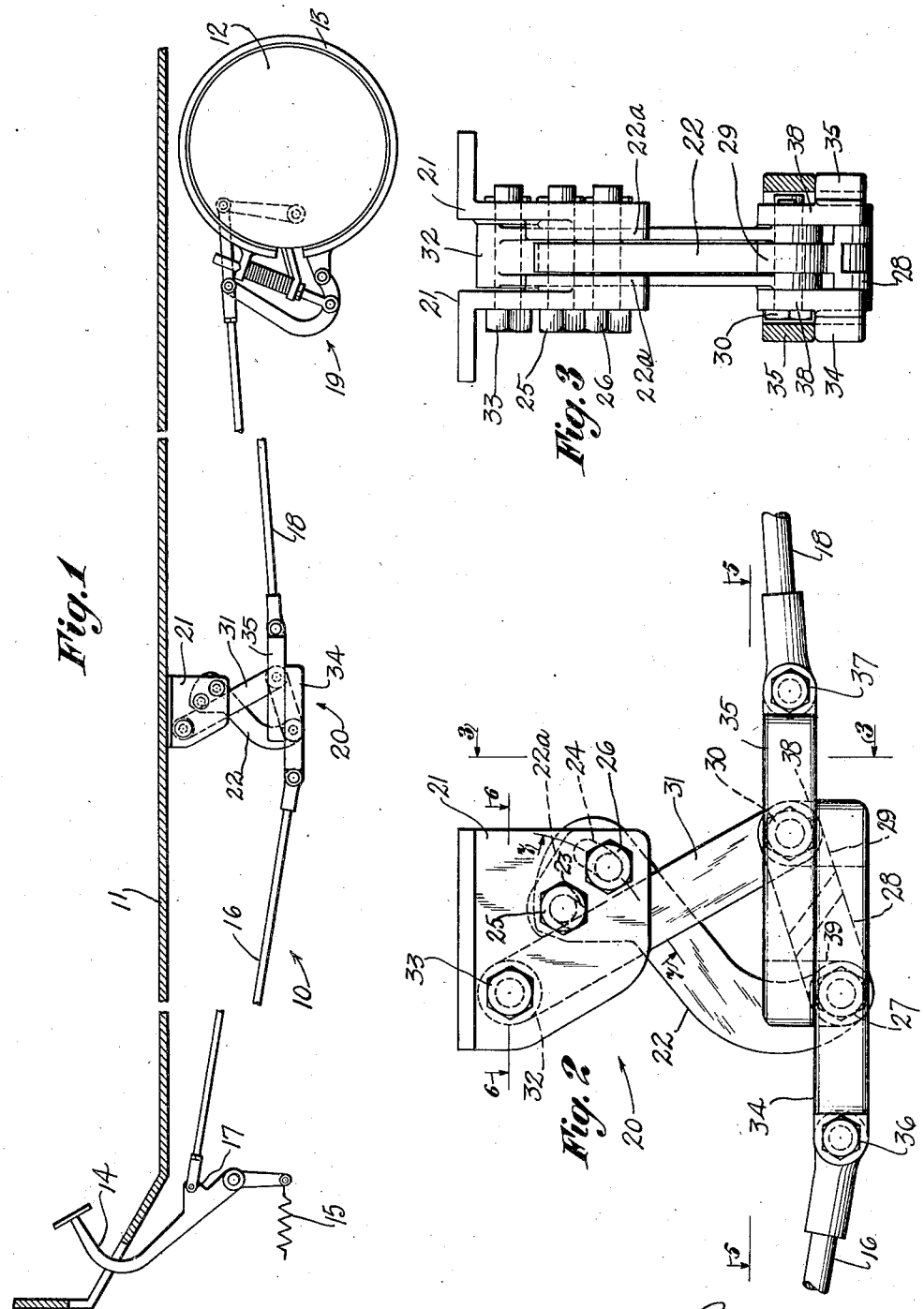

Oct. 23, 1934.  A. H. WISEMAN  1,977,786
BRAKE BOOSTER
Filed July 18, 1933  2 Sheets-Sheet 2
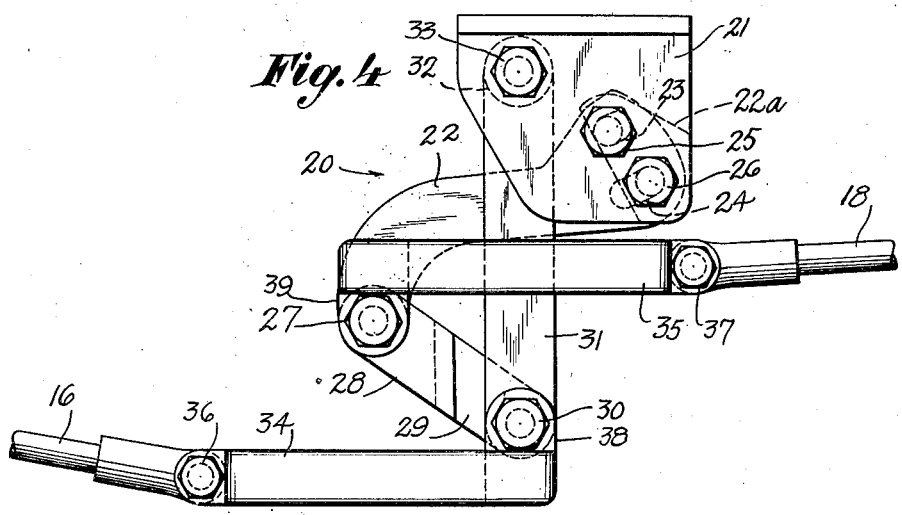
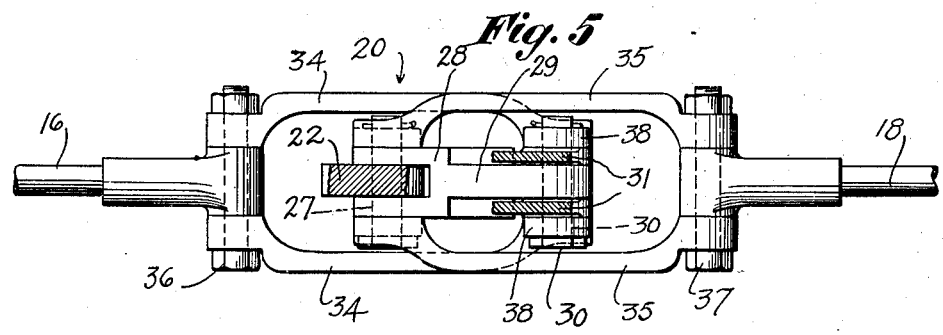
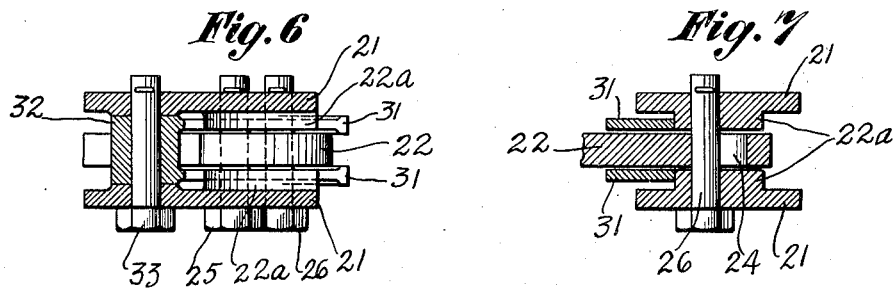
INVENTOR
A. H. Wiseman
BY
ATTORNEY Patented Oct. 23, 1934

1,977,786

UNITED STATES PATENT OFFICE 1,977,786

BRAKE BOOSTER

Augustus H. Wiseman, New York, N. Y.

Application July 18, 1933, Serial No. 680,939

6 Claims. (Cl. 74—516)

This invention relates to devices such as brake boosting or actuating mechanism.

One object of the invention is to provide a device of the character described having improved means whereby the power applied to the pedal or lever for actuating a brake is more greatly increased than has heretofore been possible.

Another object of the invention is to furnish a device of the nature set forth having improved brake actuating means adapted for a superior length of travel and to cause a full take up of the brake under greatly increased power, and so as to operate with full efficiency regardless of any wear in the brake.

A further object of the invention is to furnish a device of the type mentioned having relatively few and simple parts, and which is inexpensive to manufacture and assemble, easy to mount, and rugged and reliable in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a fragmentary side elevation of a device embodying the invention and showing the same in unoperated position.

Fig. 2 is a similar enlarged view of a portion thereof.

Fig. 3 is a view in vertical section taken on line 3—3 of Fig. 2.

Fig. 4 is a fragmentary view in side elevation showing the device in fully operated position.

Figs. 5 and 6 are views in horizontal section taken respectively on lines 5—5 and 6—6 of Fig. 2.

Fig. 7 is a sectional view taken on the curved line 7—7 of Fig. 2.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 10 denotes a device embodying the invention. The same may include a portion 11 of a motor vehicle chassis, and a brake drum 12 having a brake band 13. For operating the brake, a brake pedal 14 may be provided, held in released position as by a tension spring 15. For interengaging the brake pedal and brake, an actuating rod 16 may be provided connected at 17 to the brake pedal, and an actuating rod 18 that may be connected at one end to the brake shoe toggle denoted generally by the numeral 19.

Interconnecting the rods 16 and 18 is my novel mechanism 20 which may be in the nature of a linkage arranged for an increased freedom of power transmission. The same may be suitably mounted, as on a hanger having a pair of spaced brackets 21 that may be secured to the chassis or frame. The brackets may have bosses 22a extending toward each other, and being in spaced relation to receive an arm 22. Said arm may have at its upper end a pair of slot openings 23, 24 extending in the same general direction, and adapted to receive pivot pins 25, 26 respectively, which extend fixedly through the bosses.

To the lower end of the arm 22 is pivotally connected at 27 the yoke portion 28 of an arm 29. The other end of the arm 29 is pivotally connected as at 30 to one or more upward extending links 31, the latter being preferably yoked together at 32 and pivotally connected to the brackets as by a pin 33. Connected to the respective pins 27 and 30 are links or yokes consisting of spaced arms 34 and 35, these yokes extending in opposite directions and having at their opposed ends pins 36, 37, respectively, with which the actuating rods 16 and 18 are connected. To permit the arms 34 and 35 to lie side by side, the same may have offset portions 38, 39 extending in opposite directions, and to which the pins 27, 30 are connected.

The arrangement thus provided is highly compact and is well balanced for transmission of a high degree of power. Thus it is seen that the yoke 31 and the arm 22 are in engagement with the brackets 21 and constitute a spacer therefor, with the brackets being interconnected by the pins 25, 26 and 33. Moreover, the arm 22 is movable between the arms 31 and within the yoke 28, the arms 31 being disposed on opposite sides of the arm 29, and the arms 34 lying along the outside of the arms 31, while arms 35 snugly engage the outside of the yoke 28. In this manner the various parts mutually re-enforce and support each other.

According to the normal or released position of the device shown in Fig. 2, the arms 34, 35 extend in close proximity and in substantial parallelism with each other, the arm 22 being in position to pivot on the pin 25 and extending along an angle with the vertical between the pins 25 and 27. The arms 31 extend at an opposite angle with the vertical, between the pivots 33 and 30, and the different angles may be of suitable relative size, although the angle of arms 31 is preferably somewhat greater than the acute angle of the arm 22. The arm 29 extends in a generally horizontal direction and as near as may be possible to the true horizontal. While the distances between pivots 30—33 and 25—27 may have a suitable relation, the former is preferably somewhat greater than the latter. However, the movement of the members 34 and 35 may be substantially equal. The arms 31 may be in abutment relation with the bosses 22a, whereby movement in a counter clockwise direction is limited.

Upon exerting a tension on the rod 16, a clockwise movement of the device is initiated. If desired, the yokes 34, 35 may be maintained in parallel planes. Upon initial movement, the slack in the connections and in the brake is rapidly taken up, since the movements of rods 16 and 18 are substantially equal, as well as the forces transmitted by them. However, the arms 31 move toward a vertical position, whereby the moment or perpendicular distance from the yoke 34 to pivot 33 constantly increases at an increasing rate. Meanwhile, the moment of the arm 22 diminishes at an increasing rate, and the arm 29 swings upward toward the position shown in Fig. 4, the movement of arm 22 caused by said arm 29 diminishing. During the latter part of these movements, there is a rapid increase in the power delivered to the brake. As the limit of movement is approached, the arm 22 pivots around pin 26, as shown in Fig. 4, and pivot 25 is adapted for free relative movement in slot 23. It is thus seen that the movement of the arm 22 suffers a rapid decrease, since the movement is now determined by the vertical distance between pivots 26 and 27, and as a result, there is a great increase in available power, and, moreover, the range of the device becomes substantially greater. It will be observed that the relation between the slots 23, 24 is such that the pin 25 is normally retained in the upper part of slot 23 due to the weight of depending parts, and is so maintained while the pin 26 is being received in the upper or right hand end of the slot 24, then when pivotal motion occurs about the pin 26, the pin 25 is received in the lower or left hand end of the slot 23. These movements are not materially affected by the tension on the rods 16 and 18, since the arm 22 serves mainly as a guide, and the weight at the pins 25, 26 may be sufficient to assure the pin-slot movements above mentioned. These movements may be aided by the vertical components of the reactions on the arm 29. Thus in Fig. 2, this component acts downward on the lever 22, and becomes zero when the arm 27 is in the plane of the yoke 35. When the arm moves above yoke 35, this component is upward, and since the arm 22 is still moving leftward and clockwise, and since the slots 23, 24 approach a horizontal position, the arm 22 is caused to pivot on pin 26.

In the mechanism provided by my invention, the rods 16 and 18 together with their respective yokes or links 34, 35 may be considered as unitary elements.

It will be appreciated that various changes and modifications may be made in the device as shown in the drawings, and that the same is submitted in an illustrative and not in a limiting sense, the scope of the invention being defined in the following claims.

I claim:

1. A brake actuating device including a pair of elongated power transmitting elements arranged to lie in side by side position and to overlap each other in released position, a first link interconnecting the end portions of the elements, the latter and the link extending in the same general direction, a relatively stationary means, a second link interengaging one of the elements with the stationary means, and a third link interengaging the other element with the stationary means, for guiding the motion of the elements and so as to cause the first link to move angularly to said elements with the elements being laterally separated in operated position, whereby the power transmitted by said device to the brake is multiplied.

2. A brake actuating device including a pair of elongated power transmitting elements arranged to lie in side by side position and to overlap each other in released position, a first link interconnecting the end portions of the elements, the latter and the link extending in the same general direction, a relatively stationary means, a second link interengaging one of the elements with the stationary means, and a third link interengaging the other element with the stationary means, for guiding the motion of the elements and so as to cause the first link to move angularly to said elements with the elements being laterally separated in operated position, the second and third links crossing each other in released and operated position at an angle increasing for operated position.

3. A brake actuating device including a pair of elongated power transmitting elements arranged to lie in side by side position and to overlap each other in released position, a first link interconnecting the end portions of the elements, the latter and the link extending in the same general direction, a relatively stationary means, a second link interengaging one of the elements with the stationary means, and a third link interengaging the other element with the stationary means, for guiding the motion of the elements and so as to cause the first link to move angularly to said elements with the elements being laterally separated in operated position, the second and third links crossing each other in released and operated position at an angle increasing for operated position, one of the last mentioned links being arranged to extend in the general direction of the elements in operated position and having its pivotal connection with the stationary means constructed to include a plurality of spaced pivots alternately operative so that the pivot that is nearest to the elements is utilized in the operated position of the device.

4. A brake actuator including a plurality of power transmitting elements, a link interconnecting the same, a relatively stationary means, a link arm interengaging the latter and the link and one of the elements, said link arm having a plurality of pivotal connections with the member, each connection including a slot and a pivot pin movable therealong, a guide means for the other element, and the said slots being arranged to extend in the same general direction with each other and in such relation to the link arm that a force exerted on the link arm by the link always acts transversely of the direction of the slots to cause pivotal motion of the link arm alternately about said pins, and one of the pivotal connections being closer than the other to the element connected to the link arm, whereby the power transmitted between the elements is multiplied.

5. A brake actuating device including a pair of rods, yokes connected at one end to the rods and adapted to overlap each other and to lie in close proximity one above the other, said yokes having at their other ends portions offset toward the different yokes, a yoked arm within the yokes and interconnecting the offset portions of the yokes, a stationary hanger including a pair of spaced plates, a pair of spaced links connected to the plates and to the offset portion of the lower yoke, a guide arm pivotally connected to said plates and to the offset portion of the upper yoke, said arm lying between and crossing said links and extending into the yoked arm, said guide arm having a pair of slots extending in the same general direction and the connection of the guide arm with the plates including pins extending through said slots so that said pins function alternately as pivots upon movement of the device.

6. A brake actuating device including a pair of elongated power transmitting elements arranged to lie in side by side position and to overlap each other in released position, a first link interconnecting the end portions of the elements, the latter and the link extending in the same general direction, a relatively stationary means, a second link interengaging one of the elements with the stationary means, and a third link interengaging the other element with the stationary means, for guiding the motion of the elements and so as to cause the first link to move angularly to said elements with the elements being laterally separated in operated position, whereby the power transmitted by said device to the brake is multiplied, and the third link having its engagement with the stationary means at a plurality of alternately operative pivot points.

AUGUSTUS H. WISEMAN.